United States Patent [19]
Mayer

[11] 3,848,878
[45] Nov. 19, 1974

[54] DEVICE FOR PRODUCING A SERIES OF ELECTRICAL PULSES, WHOSE FREQUENCY IS PROPORTIONAL TO THE SPEED OF ROTATION OF THE WHEEL OF A MOTOR VEHICLE

[75] Inventor: Friedrich Mayer, Augsburg, Germany

[73] Assignee: Allegemeine Industrie Commerz, Munchen, Germany

[22] Filed: Sept. 25, 1973

[21] Appl. No.: 400,531

[30] Foreign Application Priority Data
Oct. 2, 1972   Germany............................ 2248274

[52] U.S. Cl................................ 277/25, 188/218 A
[51] Int. Cl.............................................. F16j 15/16
[58] Field of Search ......... 277/25; 188/18 A, 288 A

[56] References Cited
UNITED STATES PATENTS
| | | | |
|---|---|---|---|
| 1,938,905 | 12/1933 | Hochmuth et al. | 188/218 A |
| 3,256,027 | 6/1966 | Chapel | 277/25 |
| 3,266,811 | 8/1966 | Knauth | 277/25 |
| 3,627,390 | 12/1971 | Irwin | 277/25 |

Primary Examiner—Harry N. Haroian
Assistant Examiner—Robert I. Smith
Attorney, Agent, or Firm—Edwin E. Greigg

[57] ABSTRACT

The specification describes a sensor adapted to produce a pulsed signal, whose frequency is proportional to the speed of rotation of a motor vehicle wheel. A PTFE seal preventing access of dirt and ice is adapted to be opened centrifugally during running to reduce wear of the sealing surfaces.

2 Claims, 3 Drawing Figures

PATENTED NOV 19 1974 3,848,878
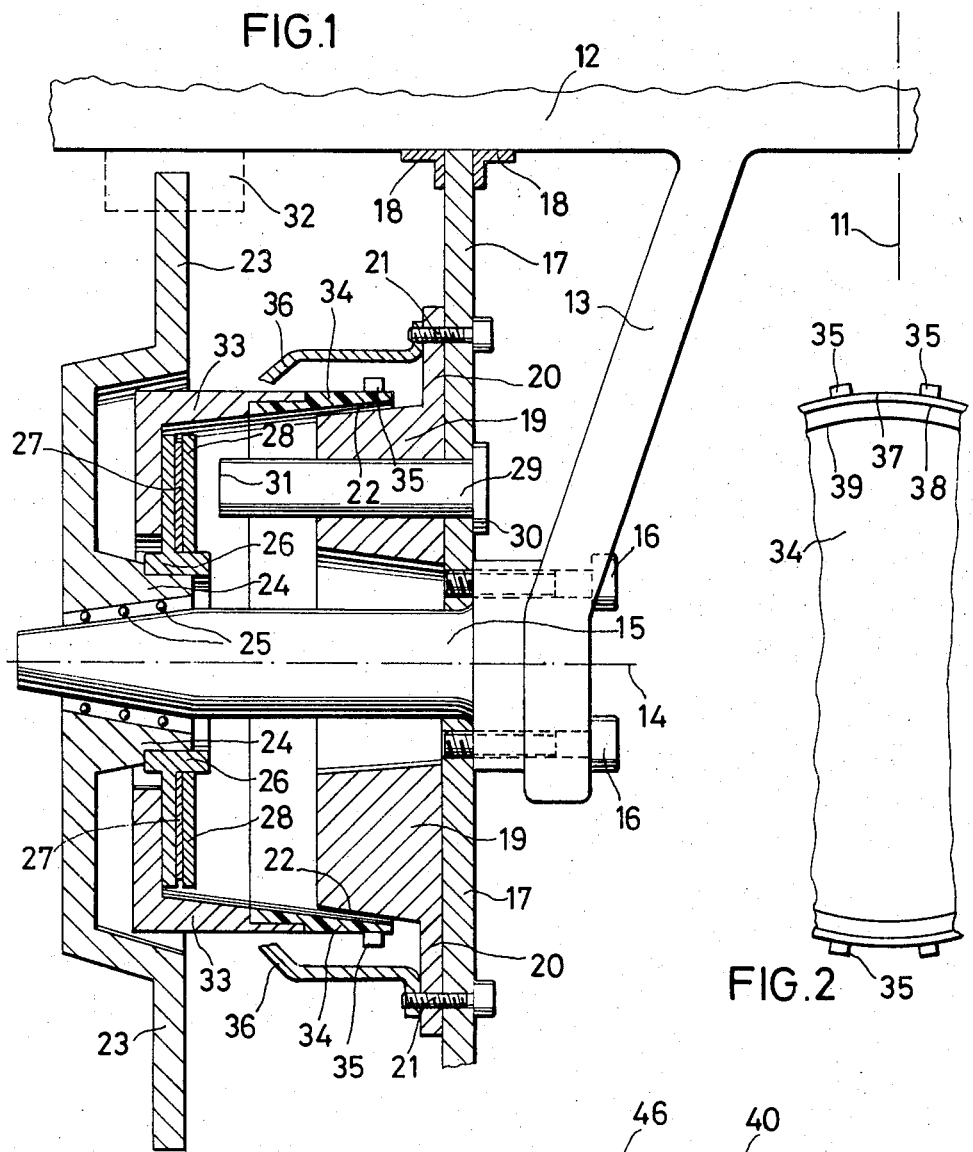
FIG.1
FIG.2
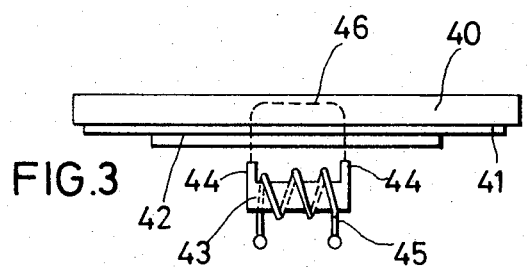
FIG.3

DEVICE FOR PRODUCING A SERIES OF ELECTRICAL PULSES, WHOSE FREQUENCY IS PROPORTIONAL TO THE SPEED OF ROTATION OF THE WHEEL OF A MOTOR VEHICLE

BACKGROUND OF INVENTION

The present invention relates to a device for producing a series of electric pulses, whose frequency is proportional to the speed of rotation of a motor vehicle wheel which is to be monitored as regards its braking behavior.

Such a device can operate both in accordance with the photoelectric principles and also in accordance with the electromagnetic principle.

A problem existing in the case of devices of this type resides in providing sealing arrangements adapted to prevent the access or penetration of small foreign bodies and water drops.

A further aim is that of preventing the build-up of ice at the sealing surface even in the case of long periods of standing of the motor vehicle coming into consideration in winter.

SUMMARY OF INVENTION

In order to attain the first-mentioned aim, more especially, the invention provides a concentric ring which is fixed to the chassis of the vehicle and is concentric to the wheel axis, the ring having a conical outer surface, a sleeve-shaped body which is also concentric with respect to the wheel axis and which is fixed to a brake element the brake disc, and a ring which consists of wear-resistant elastic plastics material and is fixed at the edge of the sleeve-shaped body, the latter ring having a conical inner surface, and having on its outer surface a number of centrifugal weights in such a manner that the inner surface of the plastics material ring rubs or engages the conical outer surface in the case of low speeds of rotation of the wheel, while in the case of higher speeds of rotation of the wheel it moves clear of the outer surface.

An embodiment of the invention, which also comprises a feature in accordance with the further improvement mentioned, will now be described in what follows with reference to FIGS. 1 and 2 of the drawing. This embodiment shown in FIGS. 1 and 2 operates with the photoelectric production of pulses.

A further drawing, FIG. 3, shows an embodiment, described below, operating with electromagnetic production of pulses.

FIG. 1 shows a device, arranged on the right-hand front wheel of a motor vehicle, the direction of view being from the front opposite to the direction of travel of the vehicle. The dot-dash line 11 indicates the plane of symmetry of the motor vehicle, though in this respect the drawing is not true to scale. A part of the motor vehicle chassis is denoted by reference numeral 12 and this part carries an support arm 13. By means of screws 16, a part 15 is connected with this support arm 13. The part 15 is concentric to the right-hand or offside wheel axis 14. An attachment wall 17 is also connected via the screws 16 with the support arm 13 and is furthermore connected with the chassis by means of two attachment brackets 18.

A metallic ring 19, which is concentric to the wheel axis 14, is connected with the wall 17 by means of its outer flange 20 and screws 21. This circular ring 19 has a conical outer surface 22.

Connected with a brake disc 23, which has a hub 24 and is mounted in a rotatable manner by means of a ball bearing 25 on the stationary component 15, the vehicle wheel, which is not shown, is connected. This wheel is the wheel which is to be monitored. Furthermore, on this hub an attachment ring 26 is fixed, which is also arranged so as to be concentric to the axis 14 and has a T-shaped cross-section. On this attachment ring 26 a thin metal disc 27 is stuck by adhesive and on this disc 27 there is a covering of protective film or a protective disc 28. This metal disc reflects the light which falls on it from the right.

The disc 27 has a large number, for example several hundred, narrow radially extending slots, which occupy a narrow zone in the zone adjacent to the edge. Between these slots there are connecting pieces, with which the edge of the disc is connected with the interior part of the disc.

Placed opposite to these radial slots is a so-called cartridge 29 which is held by means of a collar 30 on the wall 17 so that the front surface 31, opposite to the disc 27 with slots, of the cartridge 29 is opposite to the slots in the disc 27. In this cartridge 29 there is a photoelectrically operating pulse producing device, comprising an illuminating lamp, a lens and a photoelectric cell.

The brake disc 23 has its edge zone running through a brake calliper 32, which is only indicated diagrammatically, and by means of which the brake disc and, therefore the motor vehicle wheel connected in a fixed manner with it, can be subjected to a braking action.

The device shown in FIG. 1 operates in the following manner: Owing to the reflection on the connecting pieces or spokes of the slot disc 27 electric pulses are produced, which are detected by the photocell of the cartridge 29 and can be amplified. In their frequency they are always proportional to the peripheral speed of the wheel. Since the ring 26 with a T-shaped cross-section provides a firm connection between the slot disc 27 and a sleeve-shaped body 33, the latter sleeve-shaped body always moves synchronously with the slot or slotted disc 27. At its edge this sleeve-shaped body carries a ring 34 of wear-resistant elastic plastics material (PTFE, available under the registered trade mark of Teflon), whose inner surface is opposite to the conical outer surface 22 of the metallic ring 19.

In the case of a lower speed of rotation, that is to say up to about 30 km/h the plastics material ring 34 rups or slides on the conical outer surface 22 of the ring 19, while in the case of higher speeds of rotation owing to the centrifugal weights 35, which are arranged on the outer surface of the ring 34 in a large number adjacent to its right-hand free edge, the plastics material ring 34 is moved clear of the conical outer surface 22. The gap produced between the inner surface of the ring 34 and the conical outer surface 22 as a result is clearly indicated in the drawing.

Concentric with the metal ring 19 and the plastics material ring 34 there is also a protective ring 36 which is also attached by means of the screws 21. The purpose of the spring 36 is to crush any ice which may have become deposited on the outer surface of the sleeve 33, for example during periods in which the vehicle has been left standing, at the beginning of a drive. A further aim of the ring is to prevent the access of water splashed up during motion of the vehicle into the gap between the conical surface 22 and the inner surface of the ring 35.

Furthermore, the FIG. 1 indicates that the device described owing to the plastics material ring 35, which in the case of low speeds of travel of the motor vehicle is to slide or rub on the conical surface 22, prevents penetration or access of foreign bodies and also the access of water drops into the interior of the sleeve 33. The motion, always present during operation, of the edge or lip of the plastics material ring 34 with respect to the conical surface 22 prevents such penetration of small foreign bodies and drops of water. As a result these foreign bodies and water droplets cannot become deposited on the protective layer or protective disc 28 either and thus prevent the production of pulses.

Fig. 2 shows the arrangement of the centrifugal weights 35 on the outer surface of the plastics ring 34. The circles 37 and 38 delimit the right-hand end or front surface of the plastics material ring 34 and the circle 39 corresponds to the minimum internal diameter of this ring.

FIG. 3 shows instead of a photoelectric pulse producing device, which was taken as a basis in the description of FIG. 1, an electromagnetic pulse producing system.

Reference numeral 40 shows a disc, replacing the ring 26 in FIG. 1 of non-magnetic material, while reference numeral 41 denotes a slotted disc of ferromagnetic material, which has slots of the same shape and position as the disc 27 in FIG. 1. Reference numeral 42 denotes a protective disc. A permanent magnet 43 is provided with pole shoes 44 and carries a coil 45. The permanent magnet is accommodated with its pole shoes 44 in a housing similar to the housing 29 in FIG. 1. This housing is again carried on the wall 17.

When the slotted disc 41 moves past the end faces of the pole shoe 44, the permanent flux of the magnet 43 is closed via the edge of the slotted disc providing that two connecting pieces lie in front of the end surfaces of the pole shoes 44, the path of closing of the magnetic circuit being indicated by the paths denoted in dots by the line 46, that is to say via the non-magnetic carrier disc 40 when two slots are arranged in front of the pole shoe surfaces. Pulses with a frequency proportional to the instantaneous peripheral speed of the wheel are generated in the coil 45.

As regards the penetration of foreign bodies and droplets of water and as regards the movement of the edge of the plastics material ring 34 clear of the corresponding part at raised speeds of rotation of the wheel, the device in accordance with FIG. 3 operates in the same manner as FIG. 1.

I claim:

1. A device for producing a series of electric pulses, whose frequency is proportional to the speed of rotation of a motor vehicle wheel having a brake element associated therewith and which is to be monitored as regards its braking behavior, characterized by a concentric ring, which is fixed to the chassis of the vehicle and is concentric to the wheel axis, the ring having a conical outer surface, a sleeve-shaped body which is also concentric with respect to the wheel axis and which is fixed to the brake element, and a ring which consists of wear-resistant elastic plastics material and is fixed at the edge of the sleeve-shaped body, the latter ring having a conical inner surface, and having on its outer surface a number of centrifugal weights in such a manner that the inner surface of the plastics material ring rubs or engages the conical outer surface in the case of low speeds of rotation of the wheel, while in the case of higher speeds of rotation of the wheel it moves clear of the outer surface.

2. A device in accordance with claim 1, characterized in that a protective ring is fixed on the chassis of the vehicle, the ring being concentric to the wear-resistant elastic plastics ring.

* * * * *